Sept. 21, 1926.  L. DOMBOWSKY  1,600,276

TRACTION ATTACHMENT

Filed Dec. 5, 1924

INVENTOR
LINUS DOMBOWSKY

By Ralph Burch
Attorney

Patented Sept. 21, 1926.

1,600,276

UNITED STATES PATENT OFFICE.

LINUS DOMBOWSKY, OF AVONLEA, SASKATCHEWAN, CANADA.

TRACTION ATTACHMENT.

Application filed December 5, 1924. Serial No. 754,099.

This invention relates to improvements in traction attachment for automobile wheels and appertains particularly to a device of that character adapted for removable application to the vehicle wheel.

A further object is to provide such a device wherein a plurality of semi-rigid tire engaging elements, designed to embrace the tread portion of the vehicle tire are radial extensions from an annular frame adapted to be applied laterally to the wheel.

A further object is to provide a strong simple, durable and efficient device of the character aforesaid that can be easily and cheaply manufactured thereby rendering the same commercially desirable.

To the accomplishment of these and related objects, my invention resides in the construction, combination and arrangement of parts as shall be hereinafter more fully described, illustrated in the accompanying drawings, and pointed out in the claims hereunto appended.

In the drawings, forming a part of this disclosure,

Figure 1:
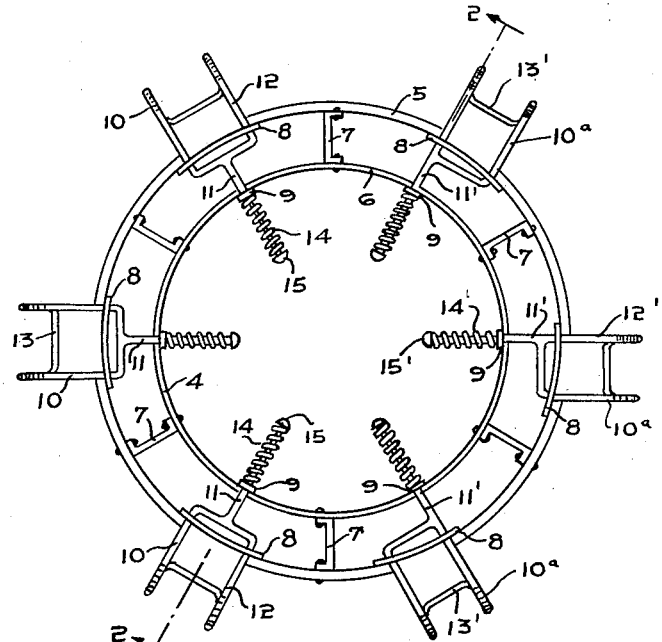
Figure 1 is a side elevation of the preferred embodiment of my invention.
Figure 2:
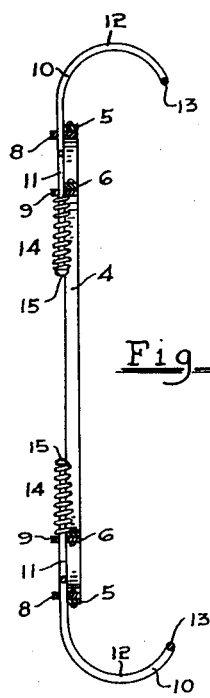
Figure 2 is a vertical section.

Referring particularly to the drawings, wherein like characters refer to like parts throughout the several views, the numeral 4 designates an annular frame composed of a pair of concentric rings 5 and 6 held in spaced relation by the braces 7.

Guides 8, arranged at suitably spaced distances about the periphery of the frame 4 and secured to the inner side of the ring or band 5. support, in conjunction with guides 9, similarly and correspondingly arranged on the inner side of the ring 6, the radially extending tire embracing traction members 10; said guides 8 and 9 projecting laterally from said frame 4.

These traction members 10 each include a stem 11 that is bifurcated to form the arms 12 that extend up the side of the vehicle tire (not shown) and are curved to fit snugly around and crosswise of the tread of the tire and, depending at the far side, are connected with the end 13.

The arms 12 passing through the slot in the guide 8, wide enough to receive both the arms, unite in the single stem 11 that alone passes through the perforation in the guide 9 and is there retained, though movable radially, by the spring 14 coiled about said stem 11 intermediate said perforated brace 9 and the stem end head 15.

While in the traction members 10 the stem 11 extends inwardly from centrally of the arms 12; the stem 11' of the traction members 10ᵃ is a continuation of one of the arms 12' for reasons hereinafter set forth. The arms 12' of the traction members 10ᴬ are curved the same as the traction members 10 and are connected with the end 13'. The members 10ᴬ are retained in position by the spring 14' coiled about the stem 11' intermediate the brace 9 and the stem head 15'.

Figure 3:
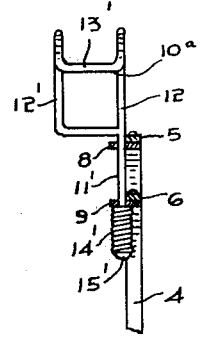
Figure 3 is a sectional detail of a part of the frame and a cooperating traction element.

In attaching my device, the frame 4 is applied laterally to the vehicle wheel and the traction, tire embracing members 10 caused to partially surround the tire and the frame moved centrally of the wheel. The traction members 10ᵃ are then extended and arranged to project laterally from the wheel (as shown in Figure 3); they are then drawn over the tread portion of the tire and allowed to snugly embrace the tire by the action of the contracted spring 14. In removing the device, the laterally extendible traction members 10ᵃ will preferably be removed prior to the central stemmed members 10.

While I have described my invention as including removable tire engaging elements of various forms it is obvious all those carried by a tire may be alike and that the frame or an equivalent may be secured to the vehicle wheel.

From the foregoing description taken in connection with the accompanying drawings, it will be manifest that a traction attachment is provided which will fulfill all the necessary requirements of such a device, but as many changes could be made in the above description and many apparently widely different embodiments of my invention constructed within the scope of the appended claims without departing from the spirit or scope thereof, it is intended that all matters contained in the said accompanying specification and drawings shall be interpreted as illustrative and not in a limited sense.

What I claim as new is:—

1. In a device of the character described, an annular frame formed of a pair of spaced concentric hoops adapted to be applied laterally to a vehicle wheel, guides mounted on the inner sides of said hoops at regular intervals about the entire circumference, said guides being arranged in radially aligned pairs, radially disposed and extendable traction elements, slidably carried by said paired guides, each traction element having a substantially rectangular body one end of which is hooked to extend transversely of and snugly embrace the vehicle tire and an integrally formed stem projecting inwardly from centrally of the other end of said rectangular body.

2. In a device of the character described, traction elements each comprising a substantially rectangular body one end of which is hooked to extend transversely of and snugly embrace the vehicle tire and an integral stem projecting inwardly from centrally of the other end of said body terminating in an enlarged head, guides to slidingly carry said traction elements, springs coiled about said stems intermediate the heads thereof and said guides to hold said traction elements in normally retracted position and means for holding said traction elements in prearranged interrelation, as and for the purpose specified.

3. A device of the character described comprising a rigid annular frame, a plurality of radially disposed and extendable traction elements carried thereby, each traction element comprising a substantially rectangular body one end of which is hooked to extend transversely of and snugly embrace the vehicle tire and an integral stem projecting inwardly from centrally of the other end of said body, second traction elements, similarly carried and likewise radially disposed and extendable, each comprising a substantially rectangular body one end of which is hooked to extend transversely of and snugly embrace the vehicle tire and an integral stem projecting inwardly forming a continuation of one side of said body, guide members to slidingly carry said traction elements and means for retaining said traction elements in normally retracted position, as and for the purpose specified.

4. In a device of the character described, a frame formed of a pair of spaced concentric hoops, guides arranged in radially aligned pairs extending from said hoops at spaced intervals, a series of radially disposed traction elements slidably mounted in said guides, second traction elements, likewise disposed, in opposed relation to said first mentioned traction elements, slidably mounted in said guides, each of said traction members having a substantially rectangular body, curved to extend transversely of and snugly engage the vehicle tire, said second traction members being capable of rotation to move the body from overhanging relation with respect to the tread of the tire, and spring means normally retaining said traction elements in retracted position, as and for the purpose specified.

In testimony whereof I affix my signature.

LINUS DOMBOWSKY.